Jan. 9, 1968   C. K. RAZAK   3,362,659
METHOD AND APPARATUS FOR LANDING JET AIRCRAFT
Filed July 6, 1965   10 Sheets-Sheet 2

Inventor
CHARLES KENNETH RAZAK

By *John H. Widdowson*
Attorney

Jan. 9, 1968     C. K. RAZAK     3,362,659
METHOD AND APPARATUS FOR LANDING JET AIRCRAFT
Filed July 6, 1965     10 Sheets-Sheet 3

Inventor
CHARLES KENNETH RAZAK
By John H. Widdowson
Attorney

Jan. 9, 1968            C. K. RAZAK            3,362,659
METHOD AND APPARATUS FOR LANDING JET AIRCRAFT
Filed July 6, 1965            10 Sheets-Sheet 4
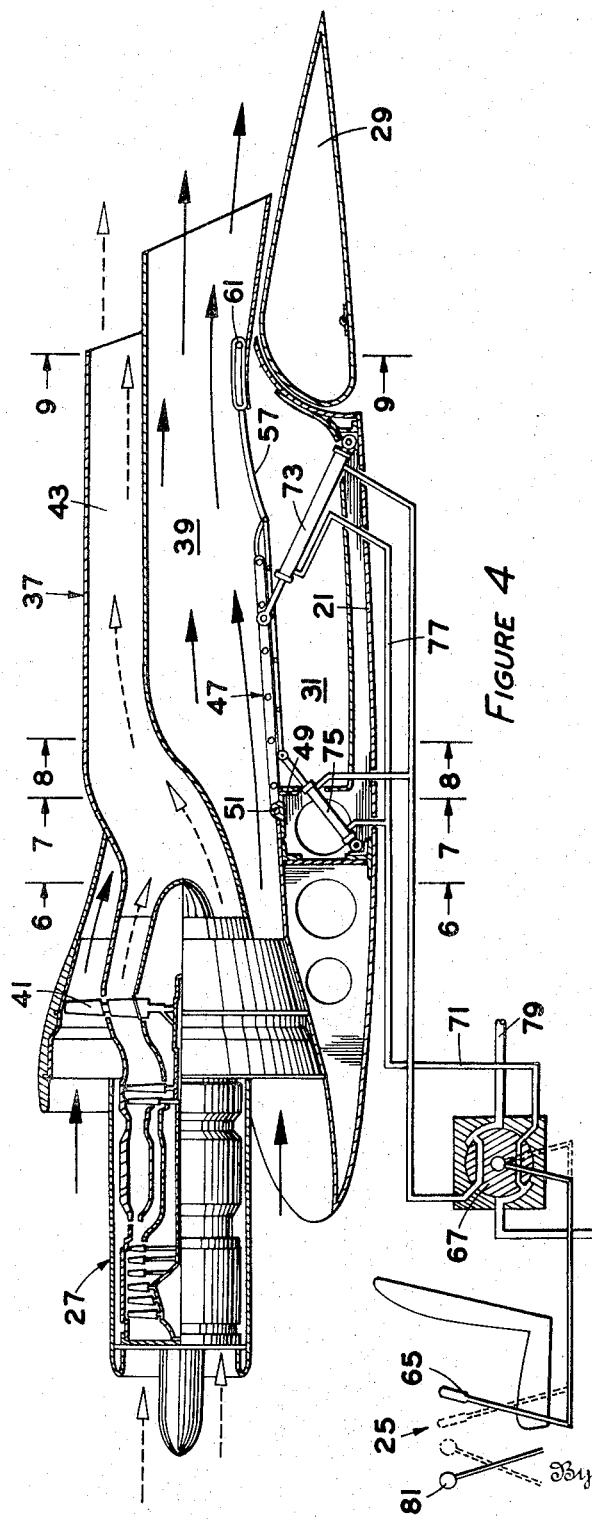
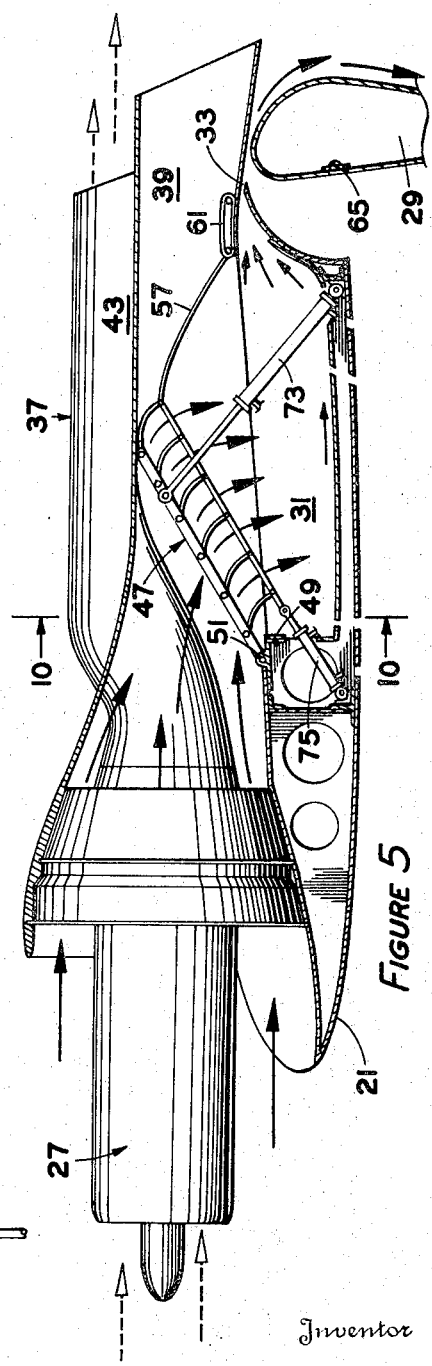
Inventor
CHARLES KENNETH RAZAK Jan. 9, 1968   C. K. RAZAK   3,362,659
METHOD AND APPARATUS FOR LANDING JET AIRCRAFT
Filed July 6, 1965   10 Sheets-Sheet 5

Inventor
CHARLES KENNETH RAZAK

By John H. Widdowson
Attorney

United States Patent Office 3,362,659
Patented Jan. 9, 1968

3,362,659
METHOD AND APPARATUS FOR LANDING JET AIRCRAFT
Charles Kenneth Razak, 2415 Mesita, Wichita, Kans. 67211
Filed July 6, 1965, Ser. No. 469,469
4 Claims. (Cl. 244—42)

ABSTRACT OF THE DISCLOSURE

The disclosure hereof is of an aircraft of the type having a fuselage, a wing with flap associated therewith, controls for the flap, and a jet engine. The flap is deflectable downwardly more than ninety degrees and up to one hundred twenty degrees, with the flap positioned at the trailing edge of the wing. A duct is provided in the wing, with outlet means therefrom adjacent the leading portion of the flap. The inlet to the duct is such that it communicates with the thrust fluid of the jet engine. The aircraft apparatus is provided of structure so that in operation the thrust fluid from the jet engine can be directed into the duct, and out the outlet thereof along the leading portion of the flap. With such operation in flight, boundary layer control is maintained over the flap as it is deflected downwardly even up to one hundred twenty degrees deflection, and in so doing a new method of aircraft control landing is provided whereby the flap is deflected at an angle greater than ninety degrees and up to one hundred twenty degrees.

---

This invention relates to jet aircraft, and especially to the landing of jet aircraft. More specifically this invention relates to a new method of landing jet aircraft, and apparatus therewith for such. Still more specifically, this invention relates to a method and apparatus for landing a jet aircraft which accomplishes an approach to a landing point along a flight path which is continuously variable at the control and the discretion of the pilot. Another aspect of this invention relates to a method and apparatus for landing a jet aircraft that provides for an angle of approach and landing far greater in degrees than that which is now possible. And still more specifically this invention relates to a method and apparatus for landing a jet aircraft which utilizes a substantial portion of the thrust fluid from the jet engine means to maintain aerodynamic flow stability of the aircraft while landing with extreme flap deflections.

It is well known that one of the greatest problems confronting the aircraft industry in its use of jet aircraft is the necessity of maintaining relative high speeds and low approach angles during landing. On a propeller driven aircraft the rearwardly expelled air from the propellers causes an augmentation of the lift factors as the air passes across the airfoils of the plane. This augmentive lift factor is not available presently in jet aircraft where such driven air is expelled behind the principal airfoil of the airplane. This condition has necessitated the use of relatively shallow approach angles and high speeds in landing a jet aircraft. In addition, it is difficult for a pliot landing at such a shallow approach angle to land his plane at a pre-selected touchdown spot on a runway thus necessitating longer runways to accommodate jet aircraft. It is apparent that this condition precludes the use of jet aircraft in communities that do not have the necessary long runway facilities for landing.

The noise factor occasioned by long and shallow approach angle of a jet aircraft has become of great importance particularly in those communities where the airports are situated in well populated areas. Many studies have been conducted by the aircraft industry as well as governmental agencies in an effort to discover ways of reducing this noise factor. It has been found that one way of appreciably reducing noise as effecting the areas adjacent to the airport is the landing of such aircraft at a substantially steeper approach angle. The presently accepted and utilized approach angle for landing of most jet aircraft is about three degrees. Studies have shown that an increase to around six degrees in approach angle would substantially decrease the noise factor around an airport.

It has been found that to achieve a steeper approach in landing it is necessary that an aircraft have a high lift co-efficient to allow a decrease in aircraft flight speed. The increase in lift co-efficient is ordinarily achieved by the use of flaps along the trailing edge of the principal airfoil of the airplane. It has been found however that a downward deflection of the flaps causes a turbulence in the boundary layer of air above the principal airfoil of the airplane. At greater flap deflections this boundary layer of air separates from the airfoil causing the aircraft to become uncontrollable. Methods of maintaining this critical boundary layer of air are well known but are effective only in relation to relatively small flap deflections. It has been unfortunate that the achievement of high lift co-efficients on a wing deteriorates stability and aerodynamic control to a point where pilots have been unable to govern approach glide path so as to achieve any degree of accuracy in touching down at a preselected point on a runway. I have found that to achieve such accuracy of touchdown the pilot must be able to govern and control the aircraft during the landing approach to compensate for the variable factors exerting forces on the aircraft during such an approach. Also in the event that the pilot is high as he approaches the initial glide point, he must establish a steeper angle of glide in order to land at a preselected spot.

To arrive at a preselected spot on a runway an aircraft must have an optimum combination of horizontal velocity and vertical rate of sink. The horizontal velocity should be as low as it is possible to fly so as to minimize the kinetic energy which must be dissipated during the roll out, and the vertical rate of sink must be small enough so that the shock absorbing system of the landing gear can absorb the downwardly directed kinetic energy without exceeding the allowable loads of the landing gear. If the vertical rate of sink exceeds the allowable maximum imposed by the landing gear structure, then the aircraft must flare or reduce its rate of sink prior to touchdown. For this reason present day jet aircraft require relatively high speeds at landing because sufficient lift co-efficient must be held in reserve to permit the airplane to be flared immediately prior to touchdown so as to reduce the rate of sink.

To overcome these problems, particularly in connection with transport fan jet aircraft it is necessary to provide an aircraft that has a high lift co-efficient but none the less stable and maneuverable while flying at slow speeds and thus capable of successfully landing at a steep approach angle and capable of accurately touching down at a preselected point on a runway, and it is particularly at these problems and necessities that my invention is directed, and I have overcome the problems and fulfilled the necessities with the new aircraft structure and method of approach and landing of my invention.

I have invented new jet aircraft, and new apparatus for use with and in landing a jet aircraft. The apparatus of my invention is used in combination with an airplane that has a fuselage, wing and flaps which are preferably deflectable downwardly more than 90 degrees and up to 120 degrees, and such is necessary for my invention to work. A jet engine is mounted on the wing, and control means for the airplane are provided. The improvement of my invention comprises a duct within the wing which has an outlet adjacent to the leading edge of the flaps. There is also an inlet to the duct from the thrust fluids of the engine. Preferably I employ a diverter to direct the exhaust from the engine into the duct. The airplane in operation passes exhaust from the engine into, through and out of the duct and over the flaps which are downwardly deflectable up to 120 degrees.

A preferred specific embodiment of my invention utilizes a transverse horizontally disposed airfoil mounted on a forward portion of the fuselage. The airfoil has a movable portion which is rotatable along a transverse axis in relation to the fuselage. The rotation of this movable portion is cooperative with the deflection of the flaps of the airplane.

The new method of my invention of landing a jet propelled airplane, which is equipped to direct a large portion of the engine thrust fluids over the flaps, includes the setting of the throttles on the jet engine to deliver a major portion of the available power, desirably between 80 and 90 percent full power, and thus deliver such power during approach and landing. This throttle setting is preferably maintained throughout the entire landing method until immediately after touchdown. A major amount of the thrust fluids from the jet engine are directed over the flaps of the airplane at which time the approach path is commenced towards a landing point by manipulation of ordinary controls and downward deflection of the flaps, preferably greater than 90 degrees and up to 120 degrees, and landing the airplane by manipulation of ordinary controls and decreasing during flair until touchdown the angle of flap deflection.

The new method of my invention of maintaining boundary layer control over downwardly deflected flaps of the jet aircraft includes directing a part of up to substantially all of the jet engine thrust fluids over flaps that can be downwardly deflected more than 90 degrees and up to 120 degrees.

My invention provides the aircraft industry with a jet propelled airplane that can take off and land on comparatively short runways and can approach a landing at relatively steep approach angle and slow speeds thus decreasing noise and insuring accuracy of touchdown.

The new apparatus of my invention maintains boundary layer control over flaps that have been deflected at angles up to 120 degrees from the wing plane by allocating the energy of propulsion engines alternately for forward thrust or for lift augmentation. The use of this source of a large volume of high velocity gaseous fluids allows flaps of an airplane to be deflected downwardly at far greater angles than has heretofore been possible while still maintaining effective aerodynamic flow stability and maneuverability of the airplane. I have found that a large volume of high velocity gas such as is available from the thrust fluids of jet engines will maintain the flap boundary layer control, the rearwardly expelled fluids following the conformation of a deflected flap even up to angles of 120 degrees. As a result of this phenomenon, the drag characteristics of the airplane are appreciably increased by the action of the deflected flap without lessening the lift co-efficient of the airfoil. Because of these features of my invention, a jet aircraft even of the large transport variety can make an approach to a landing point at relatively slow speeds and at approach angles up to 16 to 18 degrees, all the while maintaining stability of flight and maneuverability enabling the pilot to adjust the flight of the plane during landing.

During the carrying out of the new landing method of my invention the pilot maintains the power of the engines preferably between 80 to 90 percent of full power. This provides a great safety factor to a pilot upon attempting to land his airplane in that if an emergency condition should arise during his landing operation, he need merely to redirect the full thrust of thrust fluids away from the wing flaps and out through the normal tail exhaust housing of the jet engines and thus have at his disposal immediate full power for maneuverability if necessary. On those airplanes which are equipped with reverse thrust mechanisms the power of the engines would remain in this condition until the speed of the airplane had been arrested to the point where the pilot was ready to taxi.

The specific embodiment of my invention which provides for the forwardly disposed airfoil or canard provides additional stability and maneuverability for the airplane particularly when the pilot is employing extreme flap deflections. When a flap along the trailing edge of a wing is deflected, the aerodynamic forces exerted on the plane tend to cause a nosing down condition which must be overcome by manipulation of the horizontal tail surfaces common to most aircraft. The canard of my invention is synchronized with flap deflection so that stability is maintained on the aircraft regardless of the use of the extreme flap deflections of my invention.

Existing aircraft ordinarily employ flap deflections not to exceed approximately 45 degrees. Deflections greater than this amount have not been practical, because of the inability to maintain boundary layer control on the upper surfaces of the airfoil and the downwardly deflected flap. My invention provides an airplane that can operate with flap deflections up to 120 degrees and still maintain boundary layer control and thus stability, and without the aid of the additional air stream from a propeller augmenting lift and assisting in boundary layer control.

An object of my invention is to provide new aircraft means.

Another object of my invention is to provide a new method of landing an aircraft.

It is an object of this invention to provide a jet propelled airplane that can land at relatively slow speeds and a relatively steep approach angle.

It is another object of this invention to provide a jet propelled airplane which is stable and maneuverable when its flaps are deflected up to 90 degrees and more than 90 degrees and up to 120 degrees.

Still another object of this invention is to provide a jet propelled airplane wherein substantially all of the thrust fluids from the jet engines can be directed over the flaps.

One more object of this invention is to provide apparatus for deflecting thrust fluids from a jet engine over the flaps of the airplane.

And still another object of this invention is to provide additional stability to a jet aircraft utilizing flap deflections up to 120 degrees by providing a cooperating forwardly mounted transverse airfoil.

And yet one more object of this invention is to provide control apparatus for and between a forwardly mounted transverse airfoil and downwardly deflecting flaps.

And another object of this invention is to provide a new method of landing a jet aircraft.

A further object of this invention is to provide a new method of landing a jet aircraft wherein the jet engines are maintained at 80 to 90 percent of full power until the aircraft is landed.

And still a further object of this invention is to provide a new method of maintaining boundary layer control over wing surfaces and downwardly deflected flaps of an aircraft.

Various other objects, advantages, and features of the invention will become apparent to those skilled in the art from reading this disclosure.

Drawings accompany and are a part of this disclosure. These drawings depict preferred specific embodiments of the aircraft means of my invention, and it is to be understood that these drawings are not to unduly limit the scope of the invention.

In the drawings:

FIG. 4 is a longitudinal side view partially in cross section and partially cut-away of a jet engine mounted on the wing of an airplane with preferred specific deflecting assembly in a closed position and depicting diagrammatically, preferred specific control means for the deflecting assembly.

FIG. 5 is a longitudinal view taken in partial cross section of a jet engine mounted on the wing of an airplane depicting the preferred specific deflecting assembly in an open position.

Figure 1:
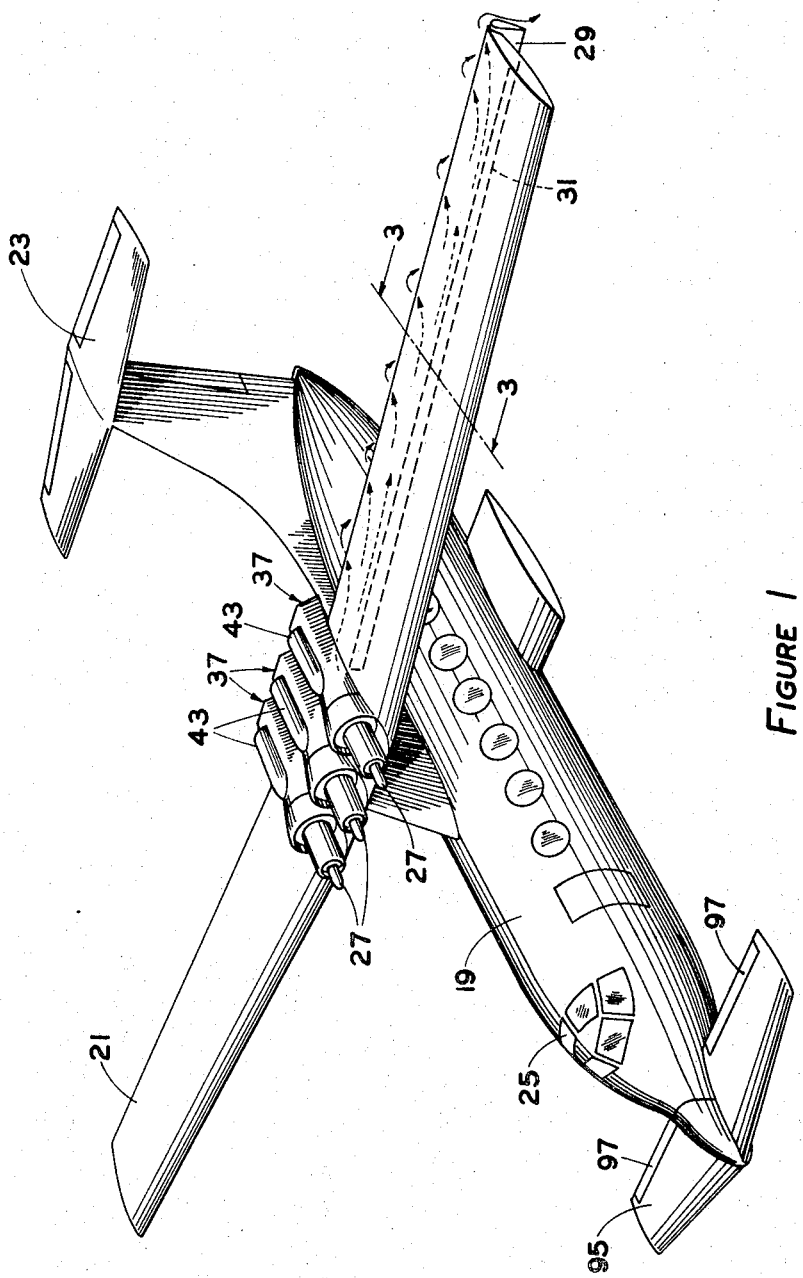
FIG. 1 is a view taken in perspective of a preferred specific embodiment of my invention, depicting a jet propelled airplane with three jet engines mounted on a high wing and a forwardly mounted canard wing.

In the following is a discussion and description of the new aircraft of my invention made with reference to the drawings whereon the same reference numerals are used to indicate the same or similar parts and/or structure. The discussion and description is of preferred specific embodiments of the new aircraft means of the invention, and it is to be understood that the discussion and description is not to unduly limit the scope of the invention.

Figure 2:
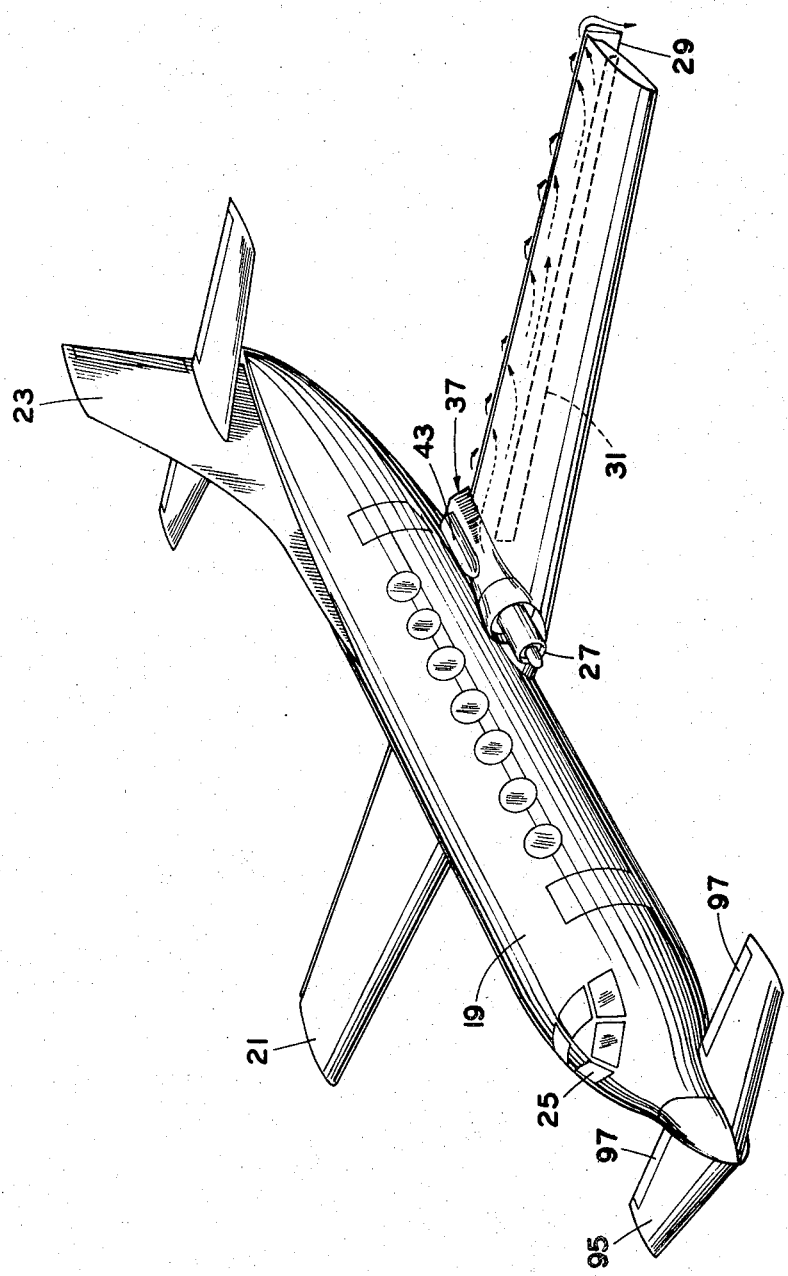
FIG. 2 is a view taken in perspective of a preferred specific embodiment of my invention depicting a low winged jet propelled aircraft which has a jet engine mounted on or in the wing on either side of the fuselage and a forwardly mounted canard wing.

Referring now to the drawings in detail, FIG. 1 depicts a preferred specific embodiment of my invention of a jet airplane having a wing mounted above the fuselage with three fan jet engines mounted in the wing. FIG. 2 is a specific embodiment depicting a jet transport airplane having a low wing with at least one fan jet engine mounted on either side of the fuselage. The aircraft means of my invention has an airplane with a fuselage 19, a wing 21, a tail assembly 23 mounted on the trailing end portion of the fuselage 19, a cockpit 25 in a forward interior portion of the fuselage 19, and at least one fan jet engine 27 mounted on the wing 21. Flaps are mounted along the trailing edge of the wing and are downwardly rotatable through an arc of 120 degrees in relation to the plane of the wing.

There is a duct 31 within the wing 21. This duct 31 is preferably in the interior rearward portion of the wing 21 and extends longitudinally in relation to the wing 21 throughout its entire length. The only outlet from the duct 31 is a slot 33 in the upper trailing end portion of wing 21. This slot 33 is so positioned so as to be immediately adjacent to hte flap 29.

The wing has an aperture 35 immediately below and adjacent to each of the engines 27. Each aperture 35 intercommunicates with the duct 31 in the wing 21. Each of the engines 27 has a tail exhaust housing portion shown generally at 37 behind the moving parts of the engine 27 and extends rearwardly from this point. There is a housing aperture in the bottom portion of the housing which is generally coincidental with and intercommunicates with the wing aperture 35.

Figure 6:
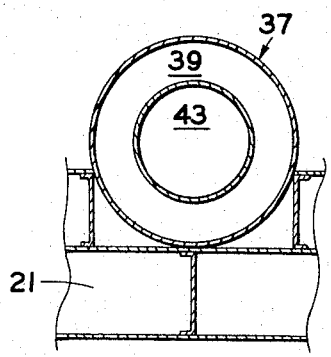
FIG. 6 is a view taken in cross section along line 6—6 of FIG. 4.
Figure 7:
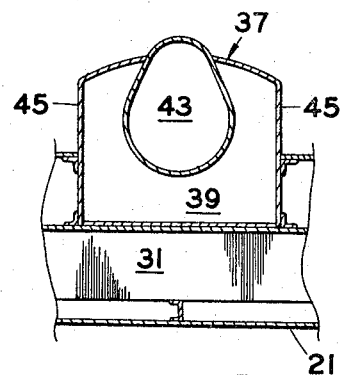
FIG. 7 is a view taken in cross section along line 7—7 of FIG. 4.
Figure 8:
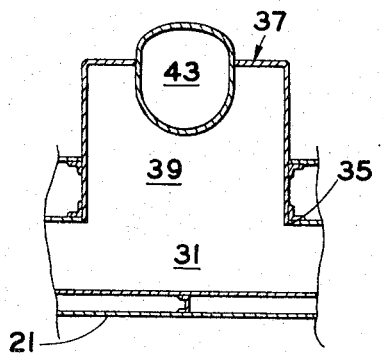
FIG. 8 is a view taken in cross section along line 8—8 of FIG. 4.
Figure 9:
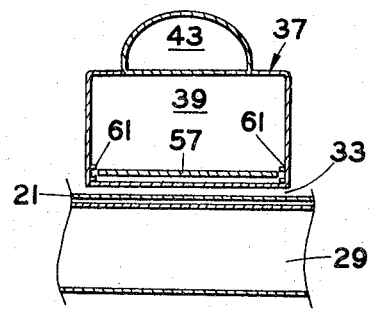
FIG. 9 is a view taken in cross section along line 9—9 of FIG. 4.
Figure 10:
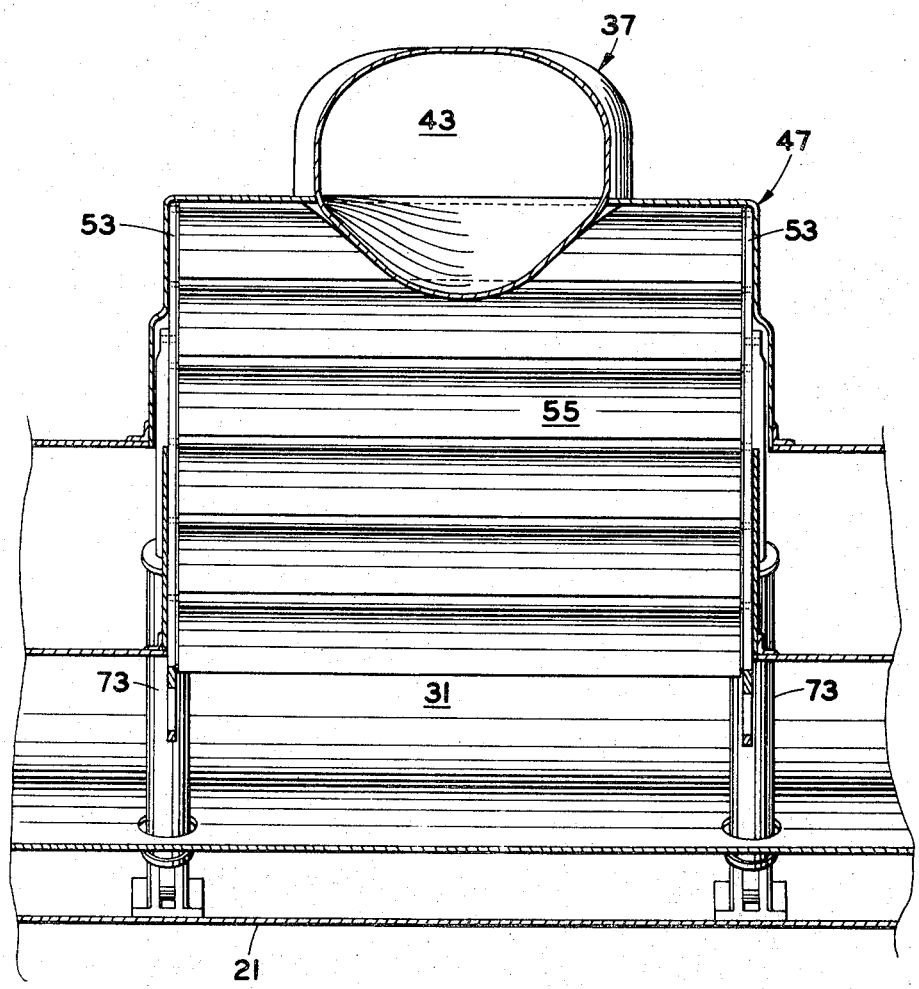
FIG. 10 is an enlarged view taken in cross section along line 10—10 of FIG. 5.
Figure 11:
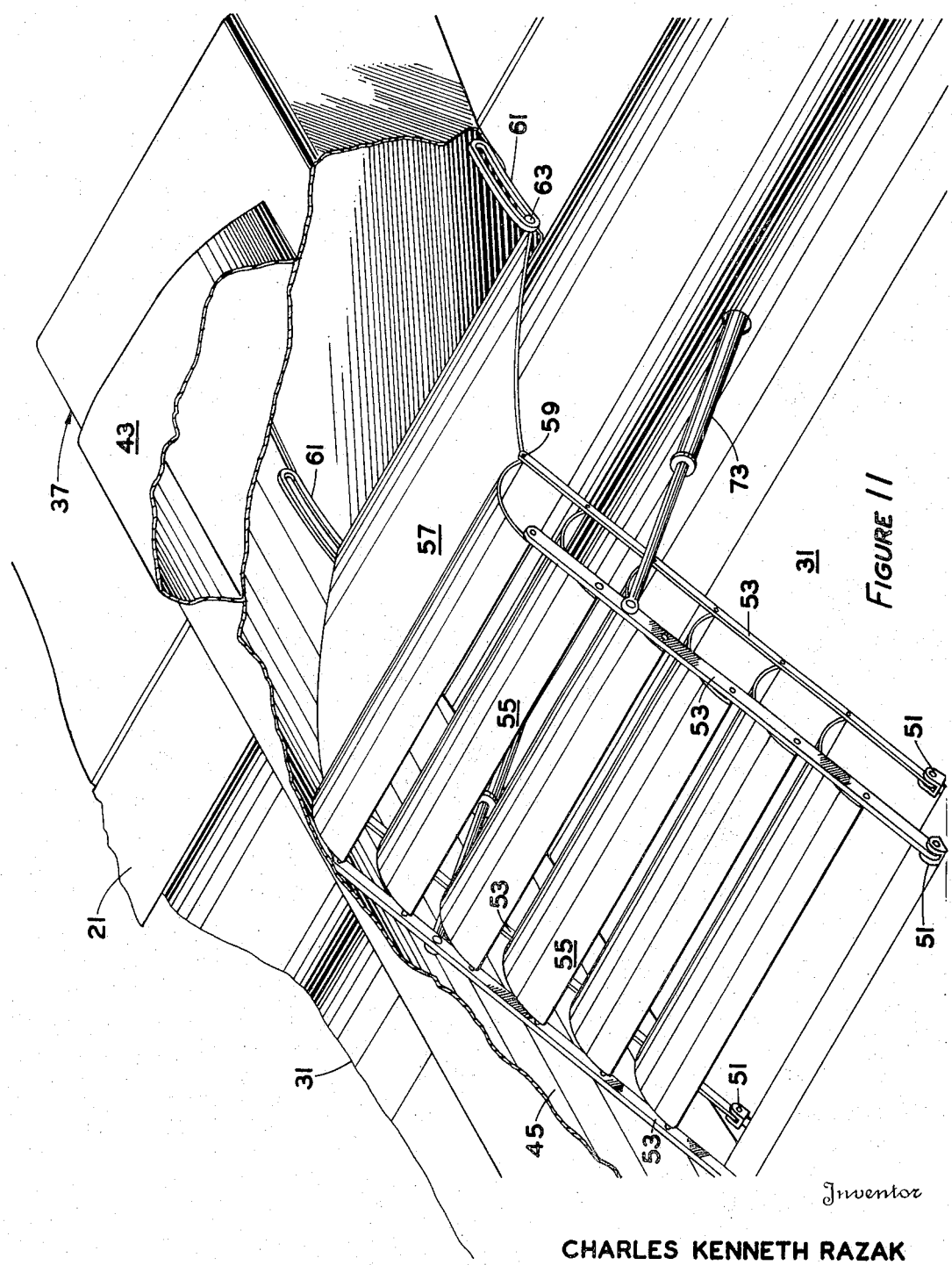
FIG. 11 is an enlarged view taken in perspective of the tail exhaust housing of a jet engine of my invention depicting the preferred specific deflecting assembly in a raised position.
Figure 12:
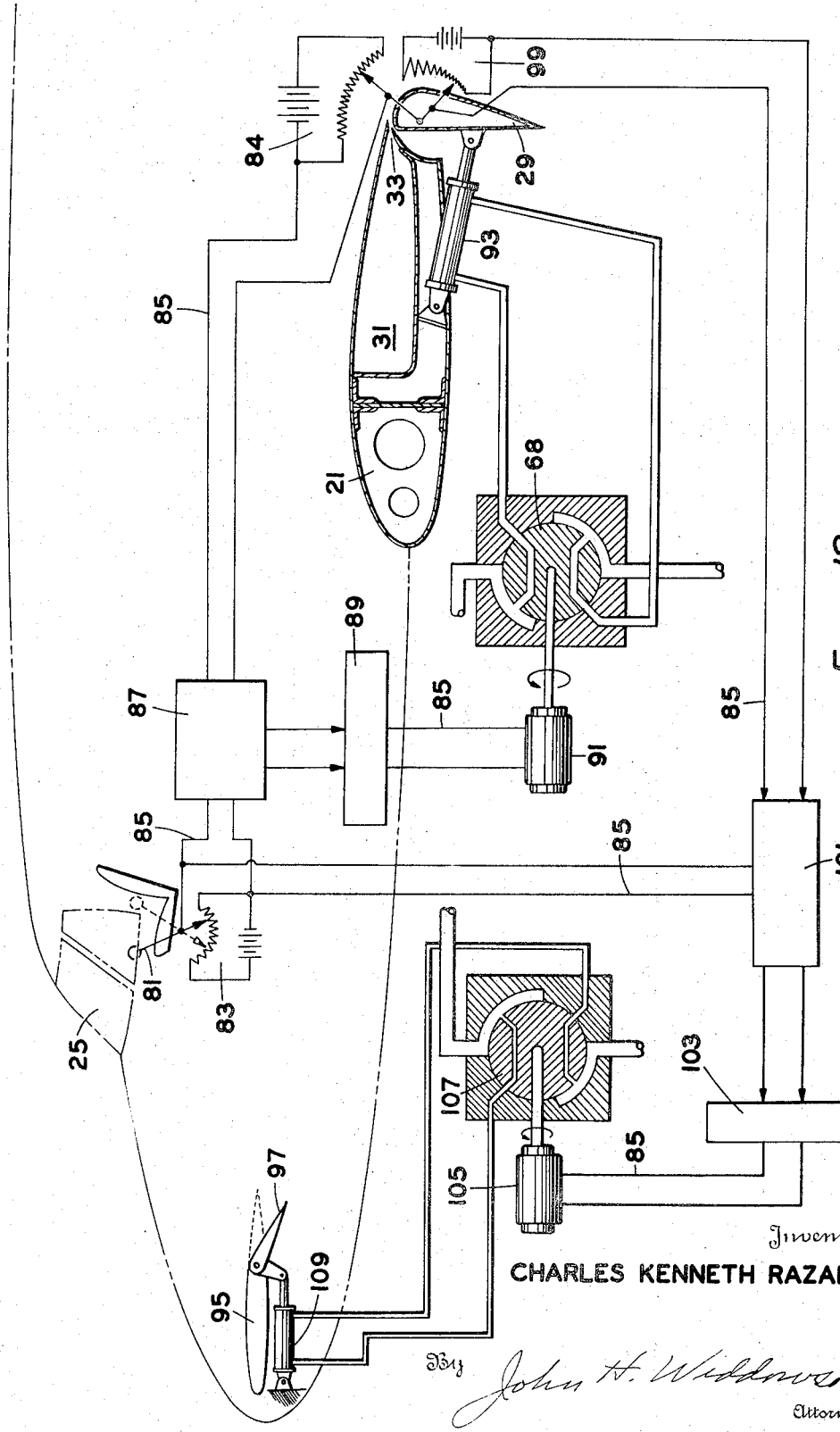
FIG. 12 is a diagrammatic drawing of preferred specific flap control means and canard control means.

FIGS. 4 to 10 inclusive show a preferred specific embodiment of my invention which provides a means for directing substantially all of the thrust fluids from a fan jet engine into the wing duct 31. In FIG. 6 is schematically depicted the configuration of the housing portion 37 immediately behind the moving parts of the engine 27. The space 39 is the discharge area for the efflux of the fan 41 of a fan jet engine. The primary air or exhaust from the gas turbine of the engine 27 is exhausted through exhaust pipe 43. As is well known in the art, in an engine of this kind the substantial part of the power of the engine developed in the gas turbine is utilized in rotating the fan 41 which in turn expells air to rearward thus providing the substantial part of the thrust of the engine. The thrust of the exhaust gases which are expelled through exhaust pipe 43 is substantially less than the thrust created by the fan 41 expelling secondary air to rearward through space 39. FIG. 7 depicts the change of contour of the exhaust pipe 43 and housing 37 wherein the housing portion 37 has substantially flat vertical sides 45 with the top portion having an elliptical configuration. FIG. 8 depicts the exhaust pipe 43 in a top portion of the housing 37 and over the intercommunicating aperture 35. FIG. 9 depicts the positioning of the exhaust pipe 43 in the rearward portion of the housing 37. The secondary air from the fan 41 passes through the space 39 and around the exhaust pipe 43 until it reaches the rearward exit or is otherwise deflected as hereinafter described.

An air deflecting assembly referred to generally at 47 is mounted on the forward transverse edge of the housing aperture 49 in such manner that it can be raised or lowered on hinges 51. The function of the deflecting assembly 47 is to direct the secondary thrust fluids downwardly into the duct 31 through the aperture 35. Any apparatus that will accomplish this result is satisfactory such as movable baffles or the like. The specific embodiment that is depicted has two pairs of parallel frame members 53 mounted as aforesaid. One pair is mounted immediately adjacent to one of the vertical sides 45 and the other pair 53 is mounted immediately adjacent to the other vertical side 45. Louvers 55 are pivotally mounted between the opposing pairs of frame members 53. A baffle 57 is mounted by hinge means 59 between the lower two of the oppositely mounted frame members 53 and on the rearward end portion thereof. A longitudinal baffle guide slot 61 is mounted on a portion of the wing 21 which is adjacent to the rearward transverse edge of the aperture 35. A slot 61 is so mounted on each side of the housing and adjacent to the vertical portion 45. A guide pin 63 is mounted along the rearward transverse edge of the baffle 57 and engages the slots 61 in a sliding relationship.

When the deflecting assembly 47 is in the raised position the top most louver 55 engages the substantially horizontal top portion of the housing 37. The baffles 55 are directed so as to deflect the air passing from the fan 41 into the space 39 downwardly through the aperture 35 and into the duct 31. The baffle 57 deflects any remaining undeflected secondary air downwardly into the aperture 35 and the duct 31. When the deflecting assembly 47 is in the lowered position, as shown on FIG. 4, it forms a substantially air tight cover in the aperture 35, sealing the duct 31. The baffle guide pin 63 slides to rearward in the guide slot 61 as the deflecting assembly 47 is lowered.

The flaps 29 of our invention are mounted on a pivot and are pivotally downwardly deflectable up to 120 degrees from the plane of the wing 21. Means for mounting flaps along the trailing edge of the wings of an airplane are well known in the art, and any such means can be used for mounting the flaps of our invention if the flaps are always deflectable in the aforesaid 120 degrees from the plane of the wing.

The deflector assembly 47 is preferably raised and lowered hydraulically in the preferred specific embodiment of our invention. Various other means of raising or lowering the assembly known to the art can be employed for this purpose such as electric motors and gearing, manual operation by levers, or the like. A pilot flap control lever 65 is mounted in the cockpit 25 of the airplane at a point readily accessible to the pilot. This lever 65 is operably connected to a hydraulic servo control valve 67. The control valve 67 is provided with hydraulic fluid under pressure. The use of the hydraulic fluid pressure means in modern aircraft is common and well known and any suitable pumping means can be used to provide the fluid under pressure to the valve 67 through the hydraulic conduit 69. The fluid is discharged from the valve in metered amounts through the discharge line 71 to the hydraulic cylinder means of the deflector assembly 47. The hydraulic cylinder 73 raises and lowers the deflector assembly 47 and the hydraulic cylinder 75 controls the angle of deflection of the louvers 55 of the assembly 47. A hydraulic conduit return line 77 returns the fluid to the valve 67 where it is redirected to the plane's hydraulic system through return line 79.

The flaps are controlled on the airplane of my invention preferably by a cooperating position sensor arrangement. A pilot flap control lever is mounted in the cockpit 25 readily accessible to the pilot. This lever 81 is operatively connected to a nonlinear potentiometer 83. This potentiometer 83 is connected by electrical wiring means 85 to a voltage comparator 87. Another non-linear potentiometer 84 is operably connected to flap 29 and is electrically connected by wiring means to the voltage comparator 87. The voltage comparator 87 delivers unbalanced voltage to a voltage amplifier 89 until such time that the flap potentiometer 84 and the cockpit mounted potentiometer 83 are in cooperating relationship in regard to downward deflection of the flap 29 and the positioning of the flap control lever 81. The voltage amplifier 89 is electrically connected by wiring 85 to a servo motor 91. The servo motor 91 is drivingly connected to another like hydraulic servo control valve 68. This control valve 68 delivers metered amounts of hydraulic fluid under pressure to a hydraulic cylinder 93 mounted between a wing 21 portion and the flap 29 to pivot the flap downwardly at any angle in relation to the plane of the wing up to 120 degrees. The last-named hydraulic servo control valve 68 is likewise supplied with hydraulic fluid under pressure and has like hydraulic fluid conduits therewith.

This aircraft means of my invention is constructed and adapted to pass substantially all of the secondary thrust fluids from the jet engine 27 and fan 41 over the flaps 29. In this preferred specific embodiment the secondary air flow is depicted by the stream lines on FIGS. 4 and 5. In FIG. 4 the secondary air is expelled to rearward through the housing portion 39 and around the exhaust pipe 43 providing thrust for operating the airplane. FIG. 5 shows the movement of this secondary air through the raised deflector assembly 47 wherein the secondary air is directed downwardly by the louvers 55 of the deflector assembly 47 through the aperture 35 and into the wing duct 31 whereupon the secondary air is passed longitudinally in respect to the wing 21 through the wing duct 31 and out through the wing slots 33 and over the deflected flap 29. The deflector assembly is raised by the pilot actuating the lever 65 which in turn moves the hydraulic servo control valve 67 which allows hydraulic fluid under pressure to pass through the hydraulic conduit 71 to the hydraulic cylinder 73 and 75. Hydraulic cylinder 73 raises the entire assembly with the baffle 57 being raised therewith and sliding in slots 61 at its rearward end portion. The hydraulic cylinder 75 is constructed to position the baffles 55 so that substantially all of the secondary air is deflected downwardly into the wing duct 31.

Figure 3:
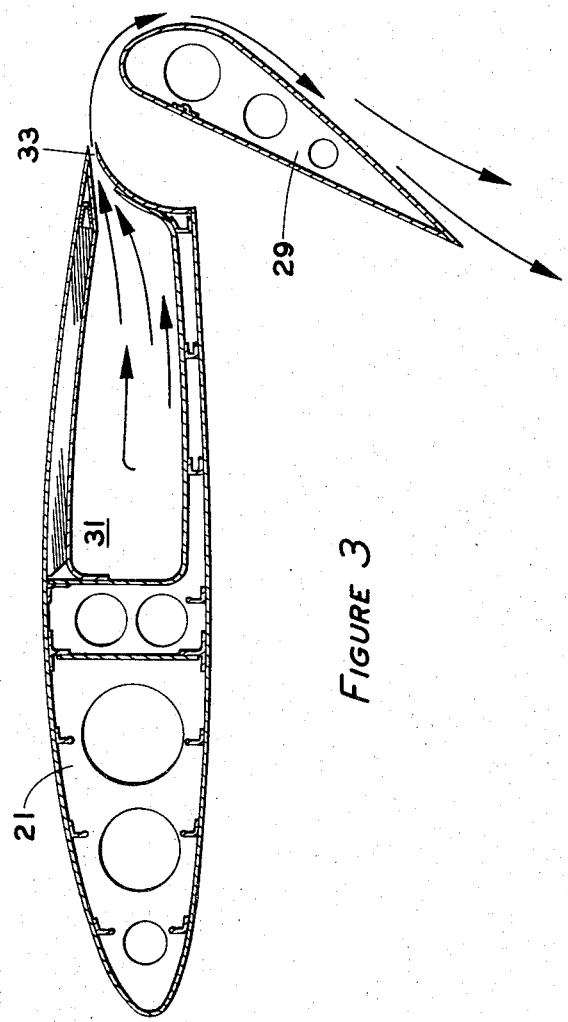
FIG. 3 is an enlarged view in cross section along line 3—3 of FIG. 1.

I have found by extensive wind tunnel tests that a large volume of gas passed over a flap at high velocity will maintain boundary layer control over the wing and flap 29. It is very important and advantageous that gaseous fluids so directed over a flap will adhere to the outward surface of the downwardly deflected flap even at 120 degrees of deflection as shown at FIG. 3. It is this action of a large volume of high velocity fluids that maintains the boundary layer control and the resultant stability and maneuverability of the aircraft of my invention while flying with extreme flap deflections.

A preferred specific embodiment of my new aircraft means provides for a horizontal disposed transverse air foil 95 mounted in the forward portion of the fuselage 19. I have found from wind tunnel tests that operation of an aircraft with flap deflections greater than 90 degrees produces a force which causes the aircraft to nose down. This nosing down action is compensated for by an opposing force created by aerodynamic forces across other surfaces of the airplane. In most aircraft this compensating force would be supplied by the tail section 23 of the aircraft. The airfoil 95 of my invention accomplishes this compensating action. This airfoil, hereinafter referred to as canard 95, has an elevator portion 97 along the trailing edge thereof which is rotatable on a transverse axis in relation to the fuselage. In my invention I have provided a mechanism which always maintains cooperative position between the elevators 97 of the canard 95 and the deflection of the flaps 29.

This cooperative control assembly has a canard control non-linear potentiometer 83 operably mounted in position sensing relationship with flap deflection. This canard potentiometer 83 is connected by electrical wiring means 85 to another voltage comparator 101 which in turn is connected by electrical wiring means 85 to the potentiometer 83 operably connected to the flap control lever 81. The voltage comparator 101 directs unbalanced non-linear voltage to another amplifier 103 which in turn directs electrical current to another servo motor 105 by electrical wiring means 85. The servo motor 105 is drivingly connected to another like hydraulic servo control valve 107 which in like manner directs measured amounts of hydraulic fluid under pressure to a canard control hydraulic cylinder 109. This cylinder 109 is operably mounted between the fuselage 19 and the canard elevator portions 97.

This control system is constructed and adapted so that the canard elevator portions 97 will be downwardly deflected in a degree of deflection that compensates for the nosing down created by the downwardly deflected flaps 29. This arrangement relieves the pilot of the necessity of having to adjust the tail section 23 to compensate for this nosing down, and thus allows the tail section to be used for maneuvering and controlling the aircraft during an approach to a landing.

To illustrate the features of the aircraft means of my invention, and to teach and aid those skilled in the art to practice my invention, I have provided graphs on which are plotted curves which are the results of my tests. At FIG. 13 lift co-efficient, drag co-efficient, and draglift ratio are plotted against flap deflection in degrees. The lift co-efficient is in reference to the formula $$\text{Lift} = CL \frac{P}{2} V^2 S$$

where CL is lift co-efficient, P is the air density, V is the velocity of the airplane and S is the wing area. For purposes of illustration and teaching the formula above is simplified by assuming that the lift of the airplane is equal to the weight of the airplane. This is true in straight unaccelerated flight, therefore, weight is equal to $CLV^2$ and is a constant. The drag co-efficient is in relation to the following formula, drag is equal to $$CD \frac{P}{2} V^2 S$$

wherein drag is the aerodynamic drag of the aircraft parallel to the flight path. The drag lift ratio is again predicated on the assumption that lift is equal to weight of the airplane. The shaded section of the graph indicates the uppermost area in which most jet aircraft operate during landing. Thus, the area of high flap deflections, that is from sixty degrees to 120 degrees, provides very favorable operating characteristics for landing an airplane in that the lift co-efficient remains high and relatively constant as shown by line CL whereas the drag co-efficient increases steadily with greater flap deflection. The drag lift ratio is more favorable for control and stability of the aircraft in this area than in the area of lesser flap deflections.

Figure 14:
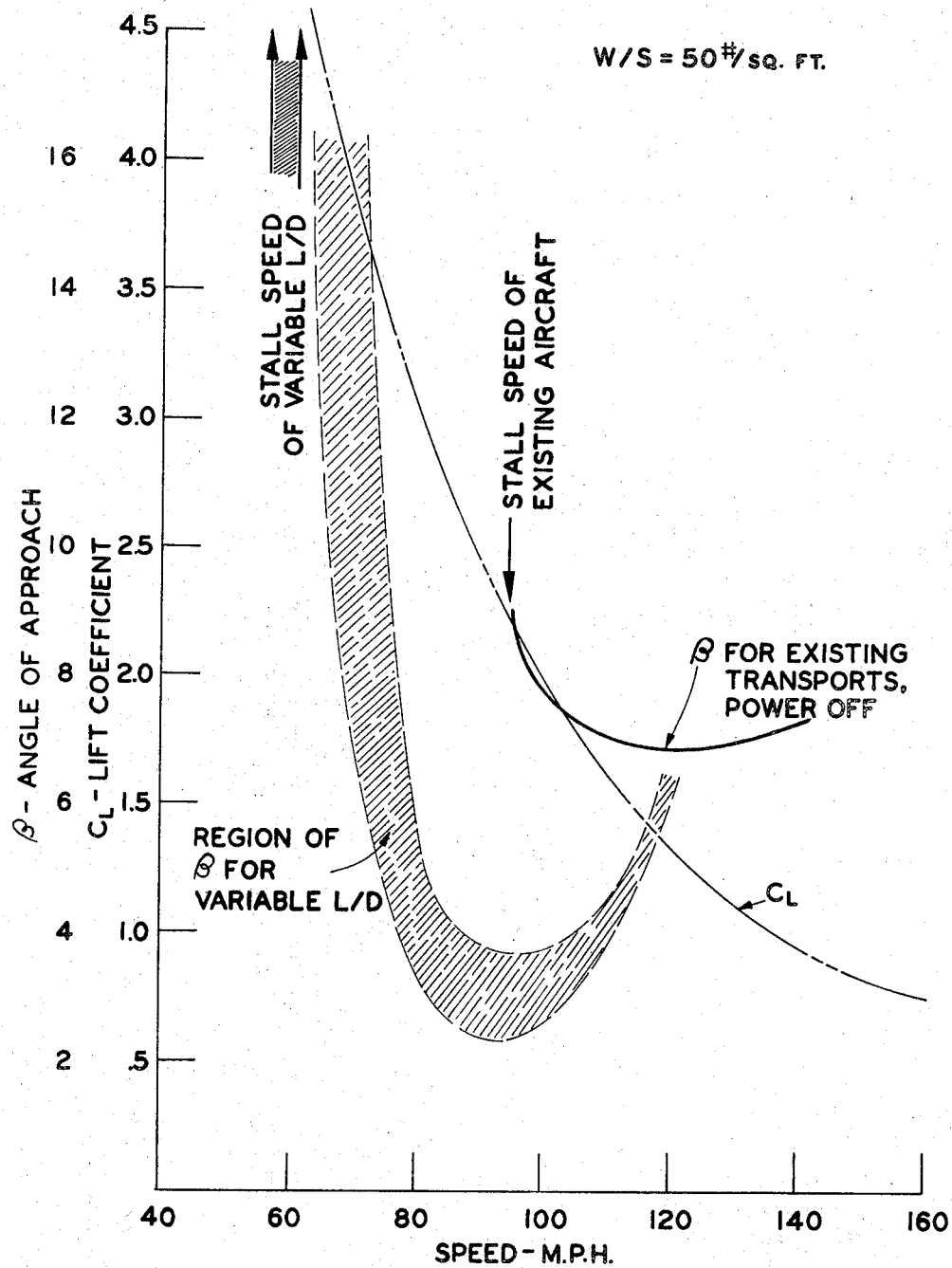
FIG. 14 is a graph wherein angle of approach and lift co-efficient are plotted against air speed of an airplane during landing, to aid and assist one skilled in the art to practice my invention.

FIG. 14 is a graph showing the operating area of the aircraft of my invention depicted by the shaded section as against the operating area of existing aircraft represented by line B during landing operations. Herein the angle of attack to a landing and lift co-efficient are plotted against air speed in miles per hour. A wing loading of 50 pounds per square foot is used as a reference point in these computations. These terms represent identical aircraft except the variable lift drag aircraft of my invention is equipped with the boundary layer control means and the flap deflection means of my invention. It can be readily seen that the stall speed of the aircraft of my invention is less than 70 miles per hour as is compared to the stall speed of existing aircraft of approximately 100 miles per hour. As can be seen, approach angles of up to 16 degrees can be safely employed by the aircraft of my invention within a speed range of between 70 and 80 miles an hour. From an examination of the curve of existing aircraft of this type it can be seen that the maximum approach angle is approximaely 8 degrees which provides for no additional lift co-efficient to provide the necessary flare for landing thereby necessitating the maintenance of relatively high speeds of around 120 miles per hour or more so as to maintain sufficient lift of the aircraft for landing.

Figure 13:
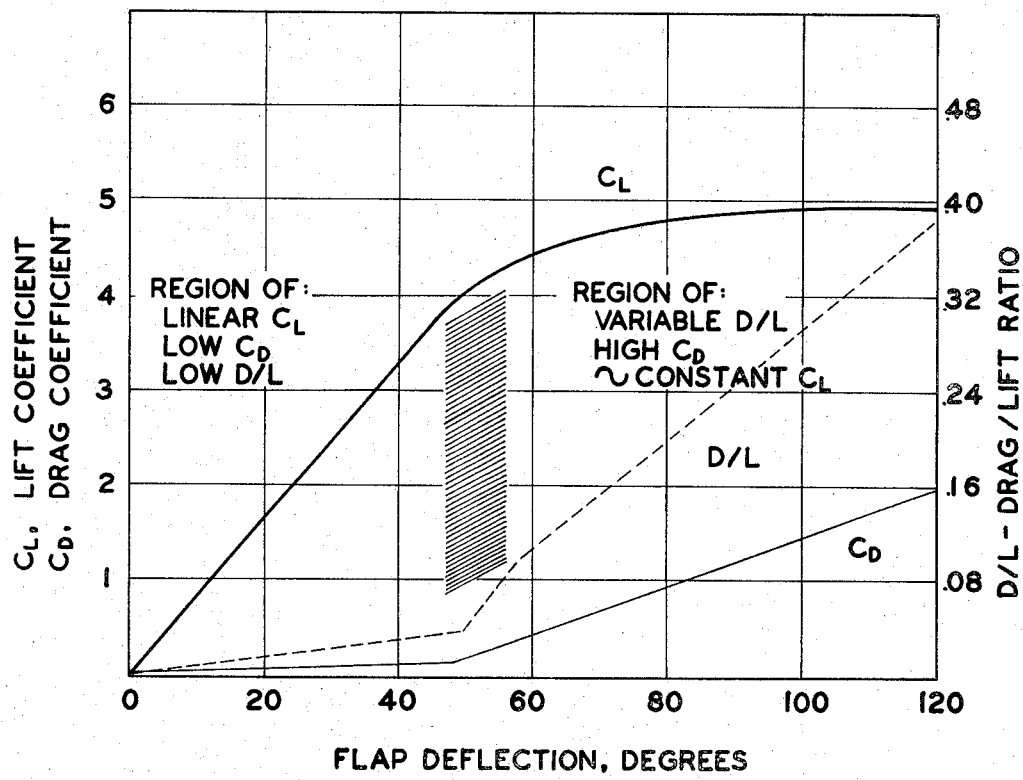
FIG. 13 is a graph wherein the lift co-efficient, drag co-efficient and drag lift ratio of an airplane are plotted against flap deflections up to 120 degrees, to teach and aid one skilled in the art to practice my invention.

With an aircraft having the apparatus of my invention for maintaining the boundary layer of air over the principal airfoil and flaps downwardly deflected up to 120 degrees, I have provided a new method of landing jet aircraft. In performing the new landing operation of my invention, the pilot of the aircraft will set the throttles of his engines so that they deliver a large portion of the available power, preferably 60 percent and greater, and most preferably between 80 to 90 percent of full power, which throttle setting is maintained throughout the landing operation, and preferably at least until after touchdown. After he has selected a landing point on the runway, preferably near the end thereof, the pilot manually actuates the deflector control lever 65 in the cockpit which in turn, as hereinbefore described, raises the deflector assembly 47 and deflects a large portion, and preferably substantially all of the secondary air from the engines downwardly into the duct 31, whereupon it is distributed longitudinally along the wing through the duct and is expelled to rearward through the slot 33 over the flaps 29. He then deflects the flaps downwardly approximately 50 degrees to slow down the aircraft, all the while maintaining level flight of his aircraft by manipulation of the ordinary controls provided for same. After the aircraft has slowed down, the pilot by manipulation of the tail section commences the approach angle towards a landing point which he has preselected, at any angle of approach up to 16 degrees, depending on his horizontal proximity to the landing point. From this point until touchdown the pilot manipulates the flap 29 deflections by the cockpit flap control lever 81. Greater flap deflection (as shown on FIG. 13) increases drag of the aircraft thus slowing it down, and this is done in the event a steeper approach angle is desired due to the external forces on the aircraft, or conversely the aircraft can be allowed to fly faster under the substantially full power operation by a decrease in flap deflection. As can be readily seen, the pilot has a great latitude in changing approach angle and speed during a landing approach so that he may arrive at his preselected landing point with accuracy. A study of the hereinbefore described graphs at FIGS. 13 and 14, shows that the pilot has good aerodynamic stability and flying characteristics in his airplane during this new landing method of my invention. Immediately prior to touchdown the pilot flares the airplane, that is, places it in a substantially horizontal attitude and then decreases flap deflection thereby decreasing the lift co-efficient and allowing the aircraft to touch down and land. The aircraft can be stopped or slowed on the runway by ordinary methods common to aircrafts such as use of reverse thrust mechanisms, brakes, and/or the like.

In the aircraft means of my invention the pilot is thus able to land his aircraft with a great degree of accuracy near the end of the runway thus decreasing the necessity of a long runway as a safety factor which would be necessary, if a pilot is unable to adequately control his aircraft to touchdown at the end of the runway. The pilot has also landed his plane at a speed substantially slower than is known for any existing jet aircraft, and as a consequence does not need the elongated roll out distance of the runway to stop his airplane. By the use of the new apparatus and landing method for jet aircraft of my invention, such aircraft can be landed at airports that could not accommodate jet planes heretofore. In addition, the steep approach angles which can be utilized with the aircraft of my invention substantially decrease the noise factor as affecting the adjacent areas to the airport.

The specific embodiment of my invention hereinbefore described relates primarily to fan jet propelled aircraft but should not be construed as being restrictive to this type of aircraft only. Application of my apparatus and landing method can be made to other types of jet propelled aircraft. In this connection my new method of maintaining boundary layer control over the upper surfaces of the principal airfoil and downwardly deflected flaps of an aircraft can apply to all types of jet aircraft. My new method of using substantially all of the thrust fluids of a jet engine for maintaining the boundary layer control over flaps which can be deflected up to 90 degrees, and greater than 90 and up to 120 degrees provides the volume and velocity of fluids necessary to maintain the boundary control over flaps that have been deflected downwardly in degrees up to and greater than 90.

The materials used in the apparatus of my invention are those well known to and in common usage by the aircraft industry. The deflecting assembly can be made of any suitable material such as steel, aluminum, aluminum alloys or the like. It is however preferably made of a heat treated aluminum alloy well known to the art. The hydraulic means, electrical control means, and servo means, are those all well known in aircraft fabrication. In an embodiment using hot thrust fluids for maintaining boundary layer control, it is desirable to utilize metals which are highly resistant to heat in the fabrication of the deflector assembly 47, housing and duct means and so forth where the metals are subjected to the high temperatures from such thrust fluids.

The foregoing discussion and description has been made in connection with preferred specific embodiments of the aircraft means of my invention. However, it is to be understood that the discussion and description is only intended to illustrate and teach those skilled in the art how to practice the invention, and such is not to unduly limit the scope of the invention, which is defined in the claims set forth hereinafter.

I claim:

1. In an airplane having a fuselage, a wing mounted on said fuselage, a tail assembly mounted on the trailing end portion of said fuselage, a cockpit, electrical and control means mounted in said fuselage, and at least one fan-jet engine, that improvement comprising, in combination, flaps mounted along the trailing edge of said wing, said flaps downwardly rotatable through an arc of 120 degrees in relation to the plane of said trailing edge of said wing, duct means within said wing, a slot in the said trailing edge of said wing and immediately forward of and adjacent to said flaps forming the outlet of said duct means, at least one elongated aperture in said wing immediately adjacent to said engine, and each of said apertures intercommunicating with said duct means in said wing, each of said engines having a tail exhaust housing portion mounted behind the moving parts thereof and extending rearwardly therefrom, a housing aperture in the bottom portion thereof and intercommunicating with said wing apertures, a portion of said housing adjacent to at least one of said apertures having substantially flat vertical interior side portions and an elliptical top portion, each of said engines having a primary air exhaust pipe mounted in a central rear portion thereof, said exhaust pipe projecting through said housing and passing upwardly and rearwardly therealong immediately above said housing aperture to an exit in the top portion thereof, to in operation, exhaust engine gases rearwardly therefrom, an engine fan in operation exhausting secondary air rearwardly through said housing around said primary air exhaust pipe, an air deflecting assembly hingedly mounted along the forward transverse edge of said aperture and projecting rearwardly therefrom, said deflecting assembly having two parallel frame members on each end thereof, one pair of said parallel frame members hingedly mounted immediately adjacent to one of said vertical side portions of said housing and the other pair of said parallel frame members hingedly mounted immediately adjacent to the other of said vertical side portions of said housing, a plurality of spaced horizontal louvers hingedly mounted on each of said frame members and between said oppositely mounted pairs, a baffle hingedly mounted between the rearward end portions of the lower two of said oppositely mounted frame members, a longitudinal baffle guide slot rigidly mounted on said wing portion adjacent to the rearward transverse edge of said housing aperture and immediately adjacent to one of said vertical side portions, another longitudinal baffle guide slot rigidly mounted on said wing portion adjacent to the rearward transverse edge of said housing aperture and immediately adjacent to the other of said vertical side portions, a baffle guide pin rigidly mounted on the rearward transverse end portion of said baffle, said guide pin operably and slidably engaging said guide slots, said air deflecting assembly constructed and adapted to form a substantially air tight cover over said housing aperture in said wing portion when in a lowered position, and when in a fully raised position to deflect substantially all of said secondary fan air downwardly through said housing aperture, said control means having therewith a flap and deflector assembly control system having a pilot flap control lever mounted in said cockpit, said lever operatively connected to a non-linear potentiometer, said potentiometer operably connected by electrical wiring to a voltage comparator, said voltage comparator operably connected by electrical wiring to a voltage amplifier, said voltage amplifier operably connected by electrical wiring to a servo motor, said motor drivingly connected to a servo control hydraulic valve, hydraulic pressure means mounted in said fuselage, said hydraulic pressure means connected to said hydraulic valve by hydraulic conduit means, at least one double acting hydraulic cylinder means operably mounted between each of said flaps and its said adjacent wing portion, hydraulic conduit means operably connecting each of said hydraulic cylinder means with said hydraulic valve, and a flap potentiometer operably connected between said flap and said comparator, other double acting hydraulic cylinder means operably mounted between each of said deflector assemblies and a lower portion of a wing portion adjacent thereto, a deflector servo control hydraulic valve operatively connected to said hydraulic pressure means, hydraulic conduit means operably connecting said other hydraulic cylinder means and said deflector hydraulic valve, said deflector hydraulic valve operably connected to a deflector control lever mounted in said cockpit, said control systems in operation constructed and adapted to lower said flaps and raise said deflecting assemblies, said flap control lever actuating said non-linear potentiometer directing unbalanced voltage through said voltage comparator and said amplifier to said motors through said wiring, said comparator operably comparing the relative positions of said control potentiometer and said flap potentiometer, said motors rotating said valves, said valves supplying measured amounts of hydraulic fluid under pressure to each of said hydraulic cylinder means to move said flaps, said deflector control lever actuating said deflector hydraulic valves, said hydraulic valves supplying hydraulic fluid under pressure to said other hydraulic cylinder means to move said deflector assemblies, said airplane constructed and adapted in operation to pass a part of or substantially all of said secondary engine fan air through said deflecting assemblies, through said apertures, into said wing duct means, through said wing duct means and into said wing slots, out of said wing slots and across said flaps downwardly deflectable up to 120 degrees.

2. In an airplane having a fuselage, a wing mounted on said fuselage, a tail assembly mounted on the trailing end portion of said fuselage, a cockpit, electrical and control means mounted in said fuselage and at least one fan-jet engine, that improvement comprising in combination, flaps mounted along the trailing edge of said wing, said flaps downwardly rotatable through an arc of 120 degrees, duct means within said wing, a slot in the trailing edge portion of said wing forming the outlet of said duct means, said engine having a tail exhaust housing portion mounted behind the moving parts thereof and extending rearwardly therefrom, said housing having an aperture in the bottom portion thereof and communicating with said duct means in said wing, an engine fan in operation exhausting secondary air rearwardly through said housing, a louvered air deflecting assembly hingedly mounted along the forward transverse edge of said housing aperture and projecting rearwardly therefrom, said air deflecting assembly constructed and adapted to form a substantially air tight cover over said housing aperture when in a lowered position, and when in a fully raised position to deflect substantially all of said secondary fan air downwardly through said housing aperture, said control means having therewith a flap and deflector assembly control system having a pilot flap control lever and a deflector assembly control lever mounted in said cockpit, said levers operably connected to hydraulic means mounted on said flap and on said deflector assemblies, said control systems constructed and adapted to move said flaps and said deflector assemblies, said airplane constructed and adapted in operation to pass secondary engine fan air through said deflecting assemblies, through said apertures, into said wing duct means, through said wing duct means and into said wing slots, and out of said wing slots and across said flaps downwardly deflectable up to 120 degrees.

3. The aircraft as defined in claim 1 wherein the said fuselage has a transverse airfoil symmetrically mounted in a forward portion thereof, said airfoil being substantially horizontally disposed and having a portion thereof rotatable along a transverse axis in relation to said fuselage, an airfoil cooperative control assembly having a cooperating non-linear potentiometer operable in relation to downward deflection of said flaps, said last-named potentiometer operably connected by electric wiring to another voltage comparator, said last-named voltage comparator operably connected by electrical wiring to another voltage amplifier, said last-named voltage amplifier operably connected by electrical wiring to another servo motor, said last-named motor drivingly connected to another servo control hydraulic valve, said hydraulic pressure means connected to said last-named hydraulic valve by hydraulic conduit means, at least one other double acting hydraulic cylinder means operably mounted on said airfoil, hydraulic conduit means operably connecting said last-named hydraulic cylinder means with said last-named hydraulic valve, an airfoil potentiometer operably connected between said airfoil and said last-named comparator, said airfoil system constructed and adapted to rotate a portion of said airfoil on its axis in cooperating relationship with the deflection of said flaps, the rotation of said flaps actuating said cooperating non-linear potentiometer directing unbalanced voltage through said last-named voltage comparator and comparing same with said airfoil potentiometer and said voltage passing through said last-named amplifier to said last-named motor through said wiring, said motor rotating said valve, said valve supplying measured amounts of hydraulic fluid under pressure to said last-named hydraulic cylinder means to rotate a portion of said airfoil in cooperating relationship with the rotation of said flaps.

4. The aircraft as defined in claim 1 wherein said fuselage has a transverse horizontally disposed airfoil mounted on a forward portion thereof, said airfoil having a movable portion rotatable along a transverse axis relative to said fuselage, and means to rotate said movable portion in cooperating relationship with the deflection of said flaps.

References Cited
UNITED STATES PATENTS

| 3,126,173 | 3/1964 | Alverez-Calderon | 244—42 |
| 3,139,248 | 6/1964 | Alverez-Calderon | 244—42 |
| 3,259,340 | 7/1966 | Whittley et al. | 244—42 |

FOREIGN PATENTS

| 889,540 | 2/1962 | Great Britain | 244—15 |

MILTON BUCHLER, *Primary Examiner.*

ALFRED E. CORRIGAN, *Examiner.*

B. BELKIN, *Assistant Examiner.*